(No Model.) 2 Sheets—Sheet 2.
N. V. PERRY.
METAL WORKING MACHINE.
No. 603,994. Patented May 10, 1898.
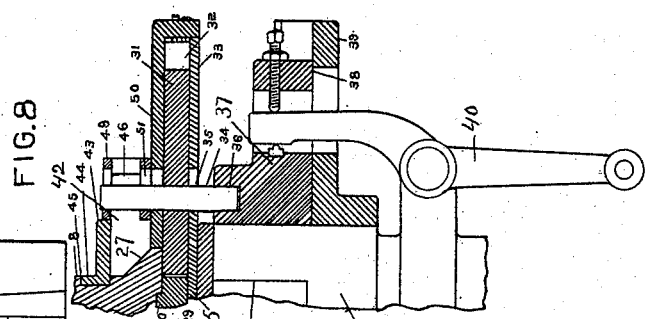
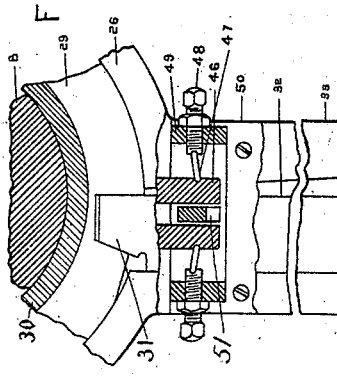
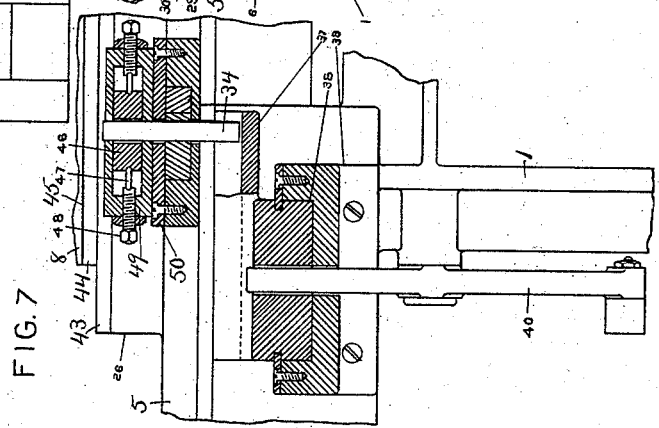
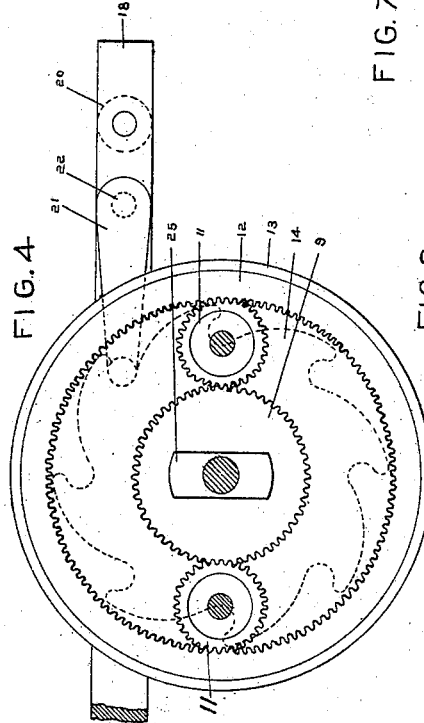
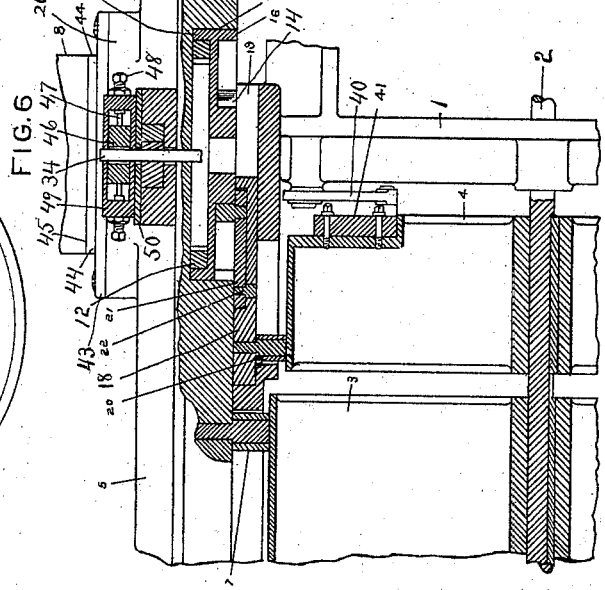
WITNESES:
INVENTOR:
Nathaniel V. Perry.

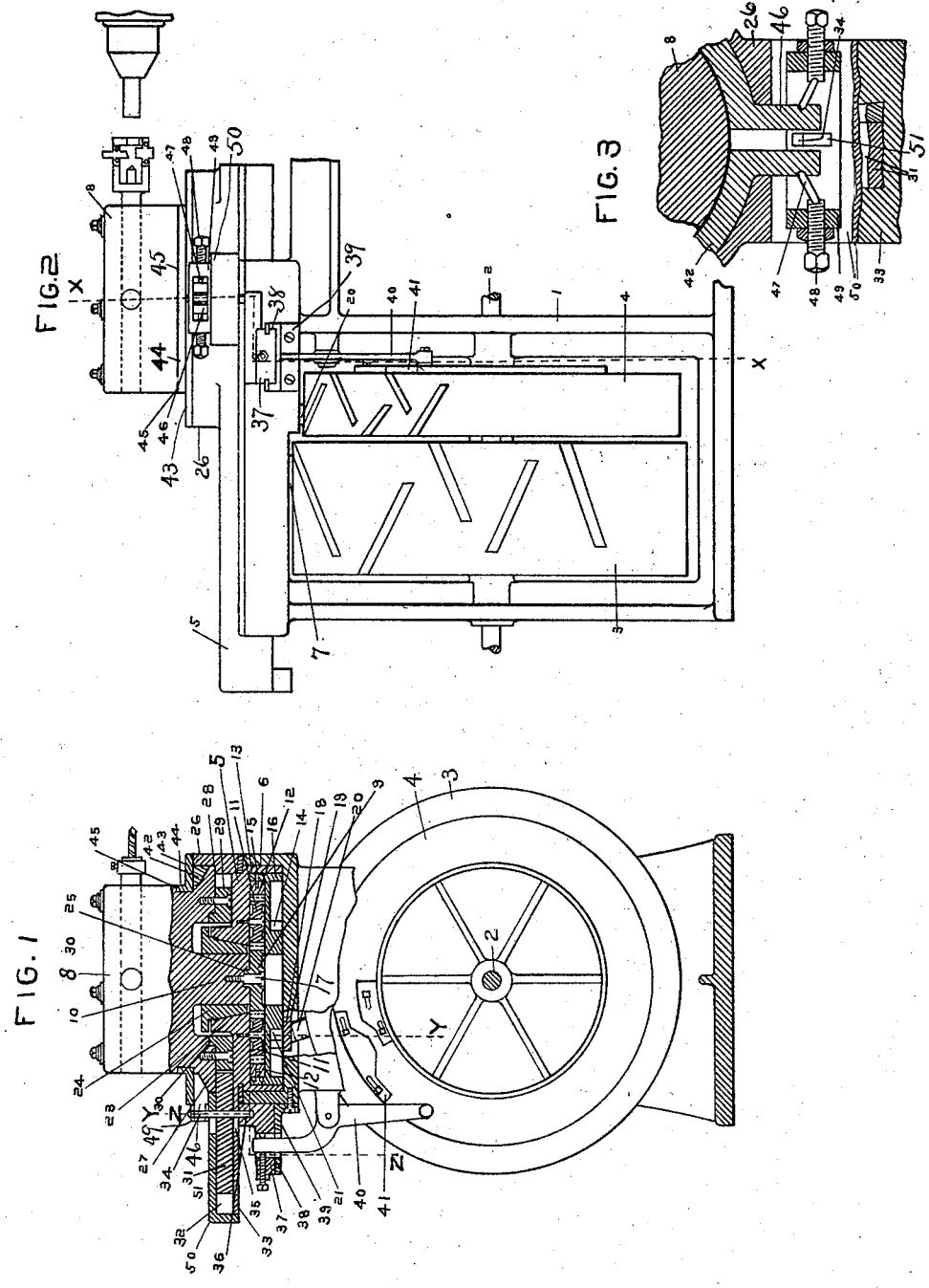

UNITED STATES PATENT OFFICE.

NATHANIEL V. PERRY, OF FALLS CHURCH, VIRGINIA, ASSIGNOR TO THE N. V. PERRY MANUFACTURING COMPANY, OF HARTFORD, CONNECTICUT.

METAL-WORKING MACHINE.

SPECIFICATION forming part of Letters Patent No. 603,994, dated May 10, 1898.

Application filed May 11, 1897. Serial No. 636,021. (No model.)

*To all whom it may concern:*

Be it known that I, NATHANIEL V. PERRY, a citizen of the United States, and a resident of Falls Church, in the county of Fairfax and State of Virginia, have invented certain new and useful Improvements in Metal-Working Machines, of which the following is a full, clear, and exact description, whereby any one skilled in the art can make and use the same.

My invention relates to the class of metal-working machines more commonly known as of the "monitor-turret" type, in which working tools are held in a revolving turret mounted in operative relation to a tool-holding device, the rotation of the turret bringing the tools into proper position to operate upon a blank; and the object of my invention is to provide a machine of this class in which the turret may be rotated independent of the reciprocating movement of the carriage on which it is mounted when so mounted and without regard to its position or condition— that is, whether moving or at rest; and a further object is to provide a turret-operating mechanism in which the turret may be rotated to any desired extent and the extent of its movement varied at will; and a further object of the invention is to provide a universal locking device for preventing rotation of the turret.

To this end my invention consists in the device as a whole, in the combination of parts, and, further, in the details of such parts and their combination, as hereinafter described, and more particularly set out in the claims.

Referring to the drawings, Figure 1 is an end view, in vertical section, of a portion of a machine embodying my invention and on dotted line X X of Fig. 2. Fig. 2 is a view in side elevation of the same. Fig. 3 is a detail view, partly in section, illustrating the manner of operating the friction-band. Fig. 4 is a detail plan view illustrating the ratchet and turret operating gears. Fig. 5 is a detail plan view illustrating the mechanism for locking the turret. Fig. 6 is a detail side view in section of a portion of the machine on dotted line $y\ y$ of Fig. 1 and showing the turret revolving and locking mechanism with the turret and intermediate gears removed. Fig. 7 is a detail view, on enlarged scale, showing in side view a portion of the machine in section on dotted line $z\ z$ of Fig. 1 and illustrating the turret locking and revolving mechanism. Fig. 8 is a detail end view, on enlarged scale and in section, showing the turret-locking mechanism.

My invention is directly related to the turret-operating mechanism of a metal-working machine, and in the drawings herein only so much of such a machine as is necessary to a clear understanding of the invention has been shown, the parts of the machine omitted from the illustration and description being of any well-known and ordinary type.

In the drawings the numeral 1 denotes the frame of the machine, that may be of any desired form and construction, preferably of metal cast to shape, and 2 a cam-shaft mounted in bearings in the frame and supporting a main cam-wheel 3 and a pawl cam-wheel 4, these cam-wheels having cams adjustably secured thereto in proper position to cause the required timely operative movement of the different parts of the machine for operating the turret.

A carriage 5 is mounted in a slideway 6 on the frame, a roller 7, mounted on a stud on the carriage, engaging the cams on the main cam-wheel for the purpose of reciprocating the carriage in the slideway. A turret 8 is mounted to revolve on the carriage 5, a turret gear-wheel 9 being secured to a central hub 10 on the turret. A boss 25 on this gear-wheel is located in a groove in the hub 10 on the turret, causing the gear and turret to rotate together.

Intermediate gears 11 are mounted on studs secured to the under surface of the carriage 5, these intermediate gear-wheels meshing with the turret gear-wheel 9, preferably on diametrically opposite sides, and also meshing with an internal gear 12, located on a gear-flange 13 on a ratchet 14. This ratchet is mounted in a socket 15 in the under side of the carriage, a bearing-flange 16 projecting from the ratchet on the opposite side from and in a plane with the gear-flange. A ratchet-stud may be used, if desired, for securing the ratchet to the carriage for convenience in assembling the parts.

A pawl-slide 18 is mounted in a pawl-slideway 19, formed in the frame of the machine, (see Fig. 6 of the drawings,) and bears on its under surface a pawl slide-roll 20, mounted on a stud secured to the slide. A pawl 21 is pivoted to the slide in such manner as to have a lateral swinging movement on the pawl-stud 22, the pawl being so located that its forward end will engage the ratchet-teeth on the ratchet 14. A suitable spring or equivalent means is employed to hold the pawl normally in engagement with the ratchet-wheel. The pawl slide-roll 20 projects into the path of movement of the cams on the pawl cam-wheel 4, by means of which the pawl-slide is reciprocated.

An interior hub 23 is formed on the carriage, and a tapered bushing 24 is located in a central opening in this hub, with a flange on its upper end overlying the edge of said hub. The hub 10 on the turret is located in an opening through the bushing that forms a bearing in which the turret revolves.

An exterior hub 26 on the carriage has a shouldered recess in which the turret is mounted, the turret-flange 27 resting on the shoulder in the recess. An index-ring 29 is secured to the under side of the turret, as by means of screws or other fastening means, a central hub 30 on the index-ring being employed for the purpose of centering the ring on the turret in assembling the parts.

An index-bolt 31 is mounted in a groove 32, formed in a lateral projection 33 on the hub. This index-bolt is tapered at its forward end to fit the tapered notches in the periphery of the index-ring. An index-bolt stud 34 is secured to the index-bolt projecting on opposite sides thereof, the lower end of the stud projecting through a slot 35 in the lateral projection 33 of the carriage and into a groove 36 in the index-stud slide 37. This index-stud slide is mounted in a slideway 38 in a bracket 39, secured to the side of the frame of the machine. An index-bolt lever 40 is pivoted on the frame, the lower end of the lever being in engagement with the face-cams 41 on the pawl cam-wheel 4 and the upper end of the lever passing through a slot in the under surface of the bracket and engaging the index-stud slide 37, by means of which the index-bolt is operated.

The turret-flange 27 is beveled on its upper surface, and a friction-band 42, with its under surface beveled to correspond with the beveled surface of the turret-flange, is supported thereon and within the shouldered recess in the exterior hub 26 of the carriage. This friction-band surrounds the turret and is held in place by means of a split collar 43, forming a cap for the shouldered recess in the hub 26 of the carriage. This collar 43 bears on its inner edge an upturned flange 44, fitting within an annular groove 45 in the outer surface of the turret. This construction of the split collar or cap with the upturned flange prevents the entrance of chips or dirt into the recess in which the turret revolves and which would interfere with the proper working of the parts.

The friction-band 42 is split on one side and toggle-lugs 46 extend laterally from the band on opposite sides of the opening therethrough. Toggles 47 are pivoted to the toggle-lugs 46, the opposite ends of each of the toggles being pivoted to the adjusting-screws 48, supported in a yoke 49, mounted on the plate 50, that forms a cap for the groove 32 in the projection 33 from the carriage 5. These toggles are supported at each end in cupped recesses in the supporting parts, this means of pivoting forming a universal joint that allows the adjusting-screws to be turned to provide the proper means of adjustment of the toggles, lock-nuts on each of the adjusting-screws securing them in any desired position of adjustment.

The yoke 49 in its movement to clamp the parts strikes against the side of the exterior hub 26, that forms a stop to limit its movement in this direction, the toggles at this time being so located that a line drawn through the pivotal points of the toggles on the adjusting-screws will pass to the rear of a line drawn through the pivotal points of connection of the opposite ends of the toggles, with a result that the yoke is locked in this position by the pressure of the clamping-band, the yoke in its movement being allowed to pass beyond the center and the pressure of the band forcing the yoke against the hub 26 instead of in the opposite direction.

The index-bolt stud 34 projects through an elongated slot 51 in the yoke 49, that through the medium of this stud is reciprocated by the movement of the index-stud slide 37. This stud is thus loosely connected with the yoke, so that the index-bolt may be nearly seated in the notches in the index-ring before said stud causes the friction-band to operate to lock the turret.

The operation of the machine is as follows: The several parts being in the position shown in the drawings, with the carriage at the forward limit of its play, a tool is placed in position to operate upon a blank that has been fed by any suitable mechanism into a chuck by which it is held to be operated upon by the tools mounted in the turret. This feeding and holding mechanism for the blank being of well-known construction in machines of this class an illustration and detailed description of the same is deemed unnecessary herein. In this position of the carriage the friction-band 42 is tightly clasped about the turret 8 and the index-bolt 31 is in engagement with the notches in the index-ring 29. The cams on the main cam-wheel 3 engage the carriage-roll 7, moving the carriage backward a distance sufficient to clear the operating-tool from the blank. A cam on the face of the pawl cam-wheel 4 now engages the index-bolt lever 40, causing the index-stud slide to be moved outward, carrying with it the index-bolt stud 34 and the index-bolt 31, the stud moving along the elongated slot 51 in the yoke 49. After the index-bolt has made a slight outward movement the engagement of the stud with the wall of the slot in the yoke causes the latter to be moved outward and relieves the turret from the pressure and grasp of the friction-band. The friction-band when exerting a grasp upon the turret is prevented from turning by the engagement of the toggle-lugs with the walls of the opening through the exterior hub 26, this rotation of the band, in fact, being prevented at all times, but being especially necessary at the time when it is operating to hold the turret from rotating. In the movement of the carriage in the slideway the index-bolt stud 34 slides along the groove 36 in the index-stud slide 37, thus keeping the parts constantly in engagement and providing for the movement of the index-bolt simultaneously with any movement of the index-stud slide without regard to the position of the carriage. When the friction-band is released and the index-bolt fully withdrawn, a cam on the pawl cam-wheel 4 engages the pawl-slide roll 20, moving the pawl-slide 18 and carrying the pawl 21, or a pawl-stud located thereon, into engagement with the ratchet 14. The continued movement of the pawl-slide imparted by the cam rotates the ratchet and the internal gear 12. The rotation of the internal gear imparts movement to the gears 11, that in turn rotate the turret gear-wheel 9 and the turret 8, to which it is secured. The extent of rotation of the turret may be governed by the extent of rotation of the ratchet caused by the engagement therewith of the pawl on the pawl-slide and the movement of the latter, as by engagement with the cams on the pawl cam-wheel 4, the degree to which the turret will be turned in a given movement of the slide under equal conditions being varied by changing the ratio between the teeth on the turret gear-wheel and the teeth on the internal gear-wheel. In the device shown the ratio between the teeth on the internal gear 12 and the turret-gear 9 is as two to one, so that a movement of the slide sufficient to cause the ratchet and internal gear to rotate a quarter of a revolution will impart to the turret-gear and turret a movement constituting half a revolution.

It will be seen from this construction that by a proper arrangement and formation of the cams on the main cam-wheel and pawl cam-wheels to cause the timely operation of the several parts the turret may be revolved with the carriage in any position and without regard to whether it be in motion or at rest and also that the extent of rotation of the turret may be changed at any time of rotation by varying the extent of movement of the pawl-slide, as by means of the arrangement and formation of the cams on the pawl cam-wheel 4 or by varying the ratio between the turret and internal gears. From this it follows that a turret containing a given number of tool-holding devices may be rotated to bring the tools successively into operation or may be rotated past one or more tools at the will of the operator and also that a blank may be operated upon by a tool held in the turret to an extent equal to the space between the end of the tool and the chuck holding the blank with the carriage at its greatest distance from the chuck. The turret not depending upon the sliding movement of the carriage for its rotation, no movement of the carriage is lost in rotating the turret, and consequently in a machine of a given size an advantage is gained over prior machines of the same size in the length of work that may be produced by utilizing the whole travel of the carriage in operating the tools. A further advantage is gained from the fact that the carriage is moved only sufficient to clear the tools from the work, no extra movement of the carriage being required to rotate the turret, and a consequent saving in the wear on the moving parts of the machine and of time employed for such movement, thus producing more work of a like character within a given time.

It will be noted that the construction of the bevel-surface on the turret and friction-band operates to hold the turret down to its seat upon the carriage as well as lock it against rotation, the pressure being exerted in a line diagonally to the axis of the turret, providing a universal clamping device, and by means of the adjusting-screws bearing the toggles any wear may be easily compensated for by a slight inward adjustment of the screws and any desired tension on the friction-band secured. The locking of the yoke in its inward position provides a positive lock in addition to the index-bolt for locking the turret against rotation, as well as means for holding the turret down to its seat on the carriage, increased pressure on the turret in any direction more positively locking the parts to retain the grasp of the friction-band on the turret. In the use of the friction-band the office of the index-bolt is more properly to locate the turret in position for the operation of the tools at the time when the band is caused to lock the turret.

While there has been illustrated and described herein one means of carrying out my invention in its several particulars, it is obvious that other means for accomplishing the same results may be employed and yet come within the scope of the invention, and I do not desire to limit myself to the exact construction of parts herein illustrated and described.

While the means for revolving the turret and for locking it in position for the operation of the tools have been described herein in connection with a turret mounted on a traveling carriage, it is obvious that the same features may be employed for operating a turret having no movement except a rotating one.

It is obvious that a friction-band having a beveled surface coacting with a beveled surface on the turret need not necessarily consist of a split ring to embody the features of invention, whereby a clamping action is exerted on the turret in a radial direction as well as in a vertical or horizontal direction, and I do not desire to limit myself to the construction of the ring with an opening through one side.

While there has been shown and described herein one means for bringing the tools and blank into operative engagement, I do not limit myself to such means, and any means for bringing the blank and tools into operative engagement will come within the scope of my invention.

I claim as my invention—

1. A blank-holder, a turret rotatively mounted in operative relation to and with its axis vertically arranged with respect to the axis of the holder and having tool-holding means, means for automatically rotating the turret independent of other movement thereof, and means for varying the degree of rotation of the turret.

2. A blank-holder, a turret rotatively mounted in operative relation to and with its axis vertically arranged with respect to the axis of the holder and having tool-holding means, means for automatically rotating the turret independent of other movement thereof, means for varying the degree of rotation of the turret, and a locking device for holding the turret against rotation.

3. A blank-holder, a turret rotatively mounted in operative relation to and with its axis vertically arranged with respect to the axis of the holder and having tool-holding means, means for automatically rotating the turret independent of other movement thereof, means for varying the degree of rotation of the turret, an index-ring secured to the turret, an index-bolt to engage shoulders on the index-ring, and means for operating the index-bolt.

4. A blank-holder, a turret mounted in operative relation to and with its axis vertically arranged with reference to the axis of the holder and having tool-holding means, means for automatically rotating the turret independent of other movement thereof, means for varying the degree of rotation of the turret, and means for varying the distance between the turret and blank-holder.

5. A blank-holder, a turret mounted in operative relation to and with its axis vertically arranged with respect to the axis of the holder and having tool-holding means, means for automatically rotating the turret independent of other movement thereof, means for varying the degree of rotation of the turret, a locking device for holding the turret during the operation of the tool, and means for varying the distance between the turret and blank-holder.

6. A blank-holder, a turret mounted in operative relation to the holder, a tool held by the turret, means for rotating the turret independent of other movement thereof, means for varying the degree of rotation of the turret, an index-ring secured to the turret, an index-bolt to engage the ring, means for operating the index-bolt, and means for varying the distance between the turret and blank-holder.

7. A turret, means for rotating the turret, a non-rotative friction-band supported in operative relation to the turret, and automatic means for causing the band to bind the turret.

8. A turret, means for rotating the turret, a beveled surface on the turret, a non-rotative friction-band having a beveled surface corresponding to the beveled surface on the turret, and automatic means for causing the band to bind the turret.

9. A rotating turret having a radially-beveled surface, means for rotating the turret, a non-rotative friction-band supported in operative relation to the turret and having a beveled surface corresponding to the beveled surface on the turret, and automatic means for causing the band to bind the turret.

10. A rotating turret having a radially-beveled surface, automatic means for rotating the turret independent of the reciprocating movement of the carriage, a non-rotative friction-band supported in operative relation to the turret and having a beveled surface corresponding to the beveled surface on the turret, an opening through the band, and means for causing the band to bind the turret.

11. A turret, means for rotating the turret, a friction-band supported in operative relation to the turret and having an opening through the side, a toggle-lug projecting from the band, a sliding yoke, a toggle pivoted to the yoke and toggle-lug, and means for operating the yoke.

12. A turret, means for rotating the turret, a friction-band supported in operative relation to the turret and having an opening through the side, a toggle-lug projecting from the band, a sliding yoke, a toggle pivoted to the yoke and toggle-lug, means for operating the yoke, and a stop to limit the movement of the yoke.

13. A turret, means for rotating the turret, a friction-band supported in operative relation to the turret and having an opening through the side, toggle-lugs projecting from the band, a sliding yoke, toggles pivoted to the yoke and toggle-lugs, means for operating the yoke, and a stop to limit the locking movement of the yoke at a point with the end of the toggles connected with the yoke located at a point beyond a line passing through each of the opposite pivots.

14. A turret, means for rotating the turret, a friction-band supported in operative relation to the turret, an opening through the band, a sliding yoke, toggles pivoted to the yoke and to the band on opposite sides of the opening, means for operating the yoke, and a stop to limit the inward movement of the yoke at a point with the ends of the toggles connected to the yoke located beyond a line passing through each of the opposite pivots.

15. A turret, means for rotating the turret, a friction-band supported in operative relation to the turret and having an opening through the side, a yoke, a toggle pivoted to the band and yoke, a lever operatively connected with the yoke, and means for operating the lever.

16. A turret, means for rotating the turret, a friction-band supported in operative relation to the turret and having an opening through the side, a yoke, a toggle pivoted to the band and yoke, an index-ring secured to the turret, an index-bolt to engage the index-ring, an index-bolt stud secured to the index-bolt and loosely engaging the yoke, and means for operating the index-bolt stud to move the index-bolt and yoke.

17. A turret, means for rotating the turret, a friction-band supported in operative relation to the turret and having an opening through the side, a yoke, adjusting-screws supported on the yoke, toggles pivoted to the band and adjusting-screws, and means for operating the yoke.

18. A blank-holder, a turret mounted in operative relation to and with its axis vertically arranged with respect to the axis of the holder, a gear in engagement with the turret, a gear operatively connected with the turret-gear, automatic means for intermittently rotating the gears, and means for varying the distance between the blank-holder and turret.

19. A reciprocating carriage, a turret mounted thereon, a cam-wheel bearing cams with means for operating said cam-wheel, and connecting means between the cam-wheel and turret for rotating the latter in any position of the carriage and whether moving or at rest.

20. A support, a turret mounted on the support, a gear engaged with the turret, an internal gear, an intermediate gear interposed between the turret and internal gear, a ratchet secured to the internal gear, and means for operating the ratchet.

21. A support, a turret mounted on the support, a gear engaged with the turret, a ratchet operatively connected with the turret-gear, a pawl arranged to engage the ratchet, a pawl-slide bearing the pawl, and means for reciprocating the pawl-slide.

22. A support, a turret mounted on the support, a gear engaged with the turret, an internal gear, intermediate gears interposed between the turret and internal gear, a ratchet secured to the internal gear, a pawl arranged to engage the ratchet, a pawl-slide bearing the pawl, and means for reciprocating the slide.

23. A support, a shouldered recess within the support, a turret having a beveled flange and located in said recess, a non-rotative friction-band having a beveled surface corresponding with the beveled surface on the turret-flange, a cap overlying the recess and friction-band, means for rotating the turret, and means for operating the friction-band.

24. A reciprocating carriage, a turret mounted on the carriage with its axis vertically arranged, automatic means for rotating the turret independent of the reciprocating movement of the carriage, and means for varying the degree of rotation of the turret.

25. A reciprocating carriage, a turret mounted thereon with its axis vertically arranged, and automatic means for rotating the turret independent of the reciprocating movement of the carriage.

26. A reciprocating carriage, a turret mounted thereon and with its axis vertically arranged, automatic means for rotating the turret independent of the reciprocating movement of the carriage, means for varying the degree of rotation of the turret, and a locking device for holding the turret against rotation.

27. A reciprocating carriage, a turret mounted thereon, means for rotating the turret independent of the reciprocating movement of the carriage, means for varying the degree of rotation of the turret, an index-ring secured to the turret, an index-bolt to engage the index-ring, and means for operating the index-bolt.

28. A reciprocating carriage, a turret mounted thereon, automatic means for rotating the turret independent of the reciprocating movement of the carriage, a friction-band supported in operative relation to the turret, and means for causing the band to bind the turret.

29. A reciprocating carriage, a turret mounted thereon and having a beveled surface, means for rotating the turret independent of the reciprocating movement of the carriage, a friction-band having a beveled surface corresponding to the beveled surface on the turret, and automatic means for causing the band to bind the turret.

30. A reciprocating carriage, a turret mounted thereon, means for rotating the turret independent of the reciprocating movement of the carriage, a friction-band supported in operative relation to the turret and having an opening through the side, a toggle-lug projecting from the band, a sliding yoke, a toggle pivoted to the yoke and toggle-lug, and means for operating the yoke.

31. A reciprocating carriage, a turret mounted thereon, means for rotating the turret independent of the reciprocating movement of the carriage, a friction-band supported in operative relation to the turret and having an opening through the side, a toggle-lug projecting from the band, a sliding yoke, a toggle pivoted to the yoke and toggle-lug, means for operating the yoke, and a stop to limit the locking movement of the yoke at a point with that end of the toggle connected with the yoke located at a point beyond a line passing through the opposite toggle-pivot and located at a right angle to the plane of movement of the yoke.

32. A reciprocating carriage, a turret mounted thereon, means for rotating the turret independent of the reciprocating movement of the carriage, a friction-band supported in operative relation to the turret and having an opening through the side, a toggle-lug projecting from the band, a sliding yoke, a toggle pivoted to the lug and yoke, means for operating the yoke, and a stop to limit the locking movement of the yoke.

33. A reciprocating carriage, a turret mounted thereon, means for rotating the turret independent of the reciprocating movement of the carriage, a friction-band supported in operative relation to the turret, an opening through the band, a sliding yoke, toggles pivoted to the yoke and band, a lever operatively connected with the yoke, and means for operating the lever.

34. A reciprocating carriage, a turret mounted thereon, means for rotating the turret independent of the reciprocating movement of the carriage, a friction-band supported in operative relation to the turret and having an opening therethrough, a yoke, toggles pivoted to the band and yoke, an index-ring secured to the turret, an index-bolt to engage the index-ring, an index-bolt stud secured to the index-bolt and loosely engaging the yoke, and means for operating the index-bolt stud to move the index-bolt and yoke.

35. A reciprocating carriage, a turret mounted thereon, means for rotating the turret independent of the reciprocating movement of the carriage, a friction-band supported in operative relation to the turret and having an opening therethrough, a yoke, adjusting-screws supported on the yoke, toggles pivoted to the band and adjusting-screws, and means for operating the yoke.

36. A reciprocating carriage, a turret mounted thereon, means for rotating the turret independent of the reciprocating movement of the carriage, a gear engaged with the turret, a gear operatively connected with the turret-gear, and means for rotating the gears.

37. A reciprocating carriage, a turret mounted thereon, means for rotating the turret independent of the reciprocating movement of the carriage, a gear engaged with the turret, a gear for rotating the turret and operatively connected with the turret-gear, a ratchet secured to the turret-rotating gear, and means for operating the ratchet.

38. A reciprocating carriage, a turret mounted on the carriage, a gear engaged with the turret, an internal gear, an intermediate gear interposed between the turret and internal gear, a ratchet secured to the internal gear, and means for operating the ratchet.

39. A reciprocating carriage, a turret mounted thereon, a gear engaged with the turret, a ratchet operatively connected with the turret-gear, a pawl arranged to engage the ratchet, a pawl-slide bearing the pawl, and means for reciprocating the pawl-slide.

40. A reciprocating carriage, a turret mounted on the carriage, a gear engaged with the turret, an internal gear, intermediate gears interposed between the turret and internal gear, a ratchet secured to the internal gear, a pawl arranged to engage the ratchet, a pawl-slide bearing the pawl, and means for reciprocating the slide.

41. A reciprocating carriage, a turret rotatively mounted thereon and having a beveled flange, a non-rotative friction-band having a beveled surface corresponding with the beveled surface on the turret-flange, a cap overlying the friction-band, means for rotating the turret, and means for operating the friction-band.

42. A reciprocating carriage, a turret mounted thereon and having a radially-beveled surface, means for rotating the turret, a band supported in operative relation to the turret and having a beveled surface corresponding with the beveled surface on the turret, means for compressing the band against the turret, a slide continuously connected with the slide-operating means, and means for operating the slide.

43. A reciprocating carriage, a turret mounted on the carriage, means for rotating the turret, a friction-band supported in operative relation to the turret and having an opening through the side, toggle-lugs projecting from the band, a sliding yoke, toggles pivoted to the yoke and toggle-lugs, a slide continuously connected with the yoke, and means for operating the slide.

44. A reciprocating carriage, a turret mounted thereon, means for rotating the turret, a friction-band supported in operative relation to the turret and having an opening therethrough, a yoke, toggles pivoted to the band and yoke, a slide continuously connected with the yoke, a lever in engagement with the slide, and means for operating the lever.

45. A reciprocating carriage, a turret mounted thereon, means for rotating the turret, a friction-band supported in operative relation to the turret and having an opening therethrough, a yoke, toggles pivoted to the band and yoke, an index-ring secured to the turret, an index-bolt to engage the index-ring, an index-bolt stud secured to the index-bolt and loosely engaging the yoke, an index-stud slide having a groove engaging the index-bolt stud, and means for operating said slide.

46. A reciprocating carriage, a turret mounted on the carriage, means for rotating the turret, a friction-band supported in operative relation to the turret and having an opening therethrough, a yoke, adjusting-screws supported on the yoke, toggles pivoted to the band and adjusting-screws, a slide having a groove, a stud located in the groove and connected with the yoke, and means for operating the slide.

47. A turret, means for rotating the turret, a friction-band having an opening through the side and supported in operative relation to the turret, and automatic means for causing the band to bind the turret.

48. A turret, means for rotating the turret, a friction-band supported in operative relation to the turret and having an opening through the side, a yoke, an adjusting-screw supported on the yoke, a toggle pivoted to the band and adjusting-screw, and means for operating the yoke.

49. A support, a turret mounted on the support, a ratchet operatively connected with the turret, a pawl-slide, a pawl mounted thereon, and means for moving the slide toward the ratchet independent of any movement of the turret or turret-carriage.

50. A reciprocating carriage, a turret mounted on the carriage, means for rotating the turret, a friction-band supported in operative relation to the turret, means for causing the band to bind the turret, a slide continuously connected with the band-operating means, and means for operating the slide.

51. A blank-holder, a turret rotatively mounted in operative relation to and with its axis vertically arranged with reference to the axis of the holder and having tool-holding means, and automatic means for rotating the turret independent of other movement thereof.

52. A sliding carriage, a turret rotatively mounted on the carriage, means for rotating the turret, a turret-lock mounted on the carriage, means for operating the turret-lock, and mechanism continually connecting the turret-lock and the locking means.

53. A reciprocating carriage, a turret rotatively mounted on the carriage, means for rotating the turret, and automatic means for locking the turret in any position of the carriage.

54. A reciprocating carriage, a turret rotatively mounted on the carriage and with its axis vertically arranged, and automatic means for rotating the turret in any position thereof and whether moving or at rest.

55. A reciprocating carriage, a turret rotatively mounted on the carriage, automatic means for rotating the turret in any position thereof and whether moving or at rest, and automatic means for locking the turret in any position thereof.

NATHANIEL V. PERRY.

Witnesses:
CHARLES H. TENNEY,
WILLIAM B. GORHAM.